United States Patent [19]

Yamamoto et al.

[11] Patent Number: 4,570,506

[45] Date of Patent: * Feb. 18, 1986

[54] OPERATING WIRE CONTROL DEVICE FOR A BRAKE SYSTEM

[76] Inventors: Sadashi Yamamoto, No. 1832, Shimoniikura, Wako-shi, Saitama; Hiroaki Kayama, No. 10-17, Honcho, Sakado-shi, Saitama; Masaki Watanabe, No. 5-3-25, Tsuji, Urawa-shi, Saitama, Japan

[*] Notice: The portion of the term of this patent subsequent to Jun. 26, 2001 has been disclaimed.

[21] Appl. No.: 469,056

[22] Filed: Feb. 23, 1983

[30] Foreign Application Priority Data

Feb. 26, 1982 [JP] Japan ............................... 57-30096
Feb. 26, 1982 [JP] Japan ............................... 57-30097

[51] Int. Cl.⁴ ........................................... F16D 65/38
[52] U.S. Cl. ........................ 74/501.5 R; 188/196 BA; 188/2 D; 192/111 A
[58] Field of Search .................. 74/501.5 R, 470; 192/111 A; 188/196 B, 196 BA, 19 GB, 24.11, 79.5 GE, 79.5 GC, 79.5 GK, 2 D

[56] References Cited

U.S. PATENT DOCUMENTS

| | | | |
|---|---|---|---|
| 1,522,764 | 1/1925 | Welker | 74/470 |
| 3,525,415 | 8/1970 | Bata et al. | 74/470 |
| 3,719,258 | 3/1973 | Margetts | 188/196 BA |
| 4,139,083 | 2/1979 | Hoshino et al. | 188/196 BA |
| 4,456,101 | 6/1984 | Yamamoto et al. | 188/196 BA |

FOREIGN PATENT DOCUMENTS 1274844 5/1972 United Kingdom ....... 188/79.5 GE

Primary Examiner—Kenneth J. Dorner
Assistant Examiner—Michael F. Trettel
Attorney, Agent, or Firm—Sughrue, Mion, Zinn, Macpeak & Seas

[57] ABSTRACT

An operating wire control device for a brake system having an adjust lever rotatable in accordance with the stroke of an inner wire. An adjuster is rotatable by the rotation of the adjust lever and an adjust bolt is movable upon rotation of the adjuster to alter the relative length of the inner wire and an outer wire. The adjust lever comprises a first lever having an abutment member for detecting the stroke of the inner wire and a second lever having a ratchet pawl engaged with a ratchet tooth on a ratchet wheel formed integrally on the adjuster. The second lever is longer than the first lever. An adjust lever spring is provided between the first and second levers, while a return spring extends between the second lever and a housing. The adjust lever spring has a spring force which becomes smaller than that of the return spring when the inner wire has been pulled beyond a prescribed stroke.

11 Claims, 9 Drawing Figures

OPERATING WIRE CONTROL DEVICE FOR A BRAKE SYSTEM

BACKGROUND OF THE INVENTION

This invention relates to a device which automatically controls the elongation of an operating wire for a brake system in a two-wheeled motor vehicle, or the like. In such a vehicle, an operating wire is usually provided between a brake operating lever and a brake unit to transmit a force from the brake operating lever to the brake unit. The wear of a brake lining in the brake unit or the elongation of the operating wire per se results in an increased play stroke of the wire which requires gradual changes in the application and "feel" of the brake operation.

SUMMARY OF THE INVENTION

Given these shortcomings of the prior art, it is an object of this invention to define a wire control device for a brake system that eliminates those disadvantages.

It is another object of this invention to define a brake system wire control device wherein the adjust lever has a smaller operating stroke to reduce input loss.

Yet another object of this invention is to define a wire control device for a brake system applicable to two-wheel vehicles in which the housing dimensions are reduced by optimizing adjust lever rotation.

This invention overcomes the disadvantages of the prior art by defining an operating wire control device comprising an adjust lever rotatable by detecting the stroke of an inner wire. An adjuster is rotatable by the rotation of the adjust lever and an adjust bolt is movable upon rotation of the adjuster to substantially increase the length of an outer wire. This provides an operating improvement which prevents any reduction in efficiency during the rotation of the adjust lever, and in which a smaller amount of rotation is sufficient for the adjust lever. Consequently, the space occupied by a housing may be minimized.

The invention will now be described by way of example with reference to the drawings and the preferred embodiments that follow.

DESCRIPTION OF THE PREFERRED EMBODIMENTS

Figure 1:
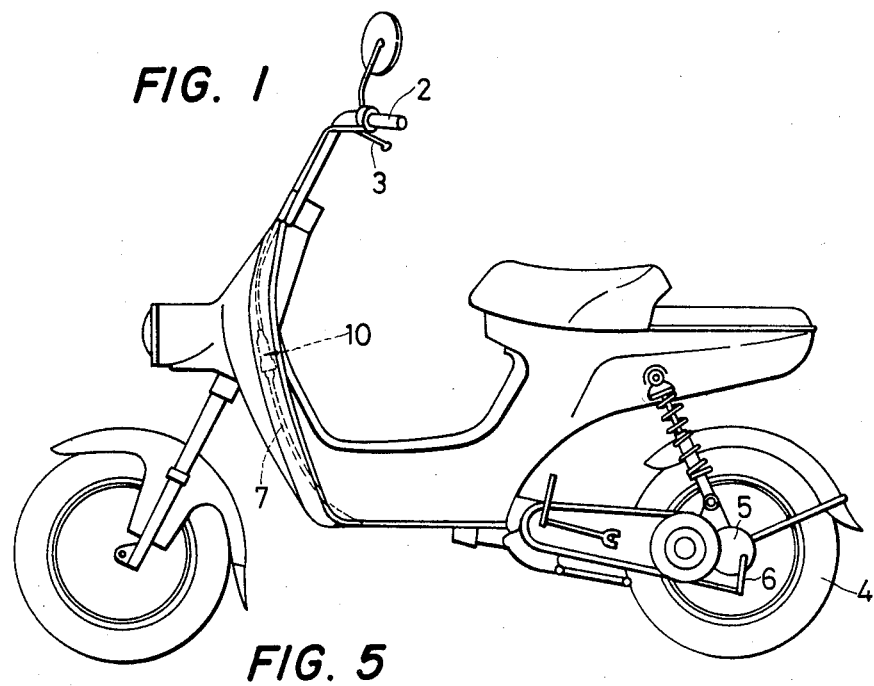
FIG. 1 is a front elevational view of a two-wheeled motor vehicle equipped with a wire control device embodying this invention.
Figure 2:
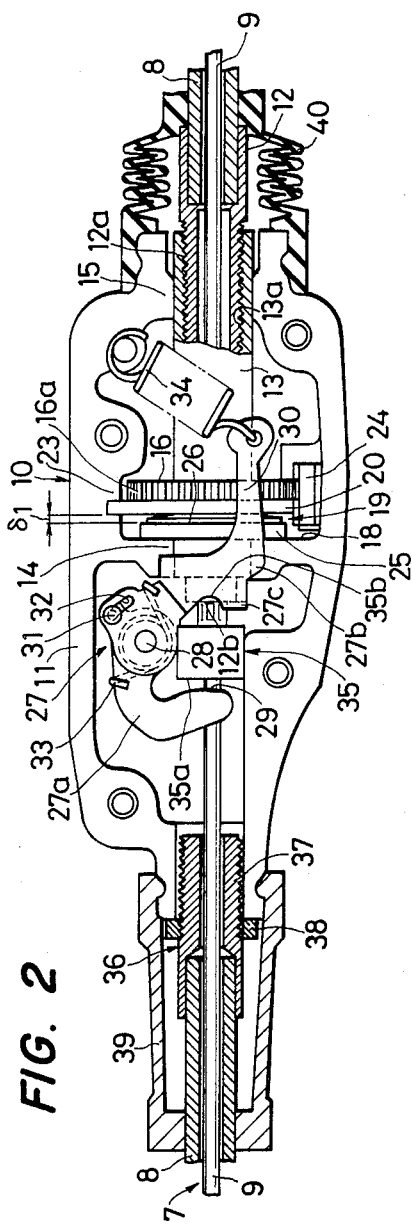
FIG. 2 is a front elevational view of the wire control device of this invention in accordance with a first preferred embodiment thereof.

A two-wheeled motor vehicle 1 shown in FIG. 1 has a handlebar 2 to which an operating lever 3 is rotatably attached. An operating wire 7 extends between the operating lever 3 and a lever 6 for actuating a brake unit 5 for a rear wheel 4. The operating wire 7 as shown in FIG. 2 comprises an outer wire 8, and an inner wire 9 extending through the outer wire 8, as is known in the art. The operating wire 7 is provided intermediate the ends thereof with a device 10 for automatically adjusting the play stroke of the operating lever 3, and therefore, the elongation of the inner wire 9.

Figure 5:
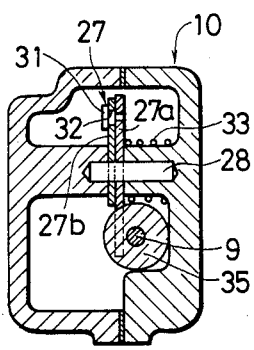
FIG. 5 is a cross sectional view showing the relationship between the adjust lever and the actuating member.
Figure 4:
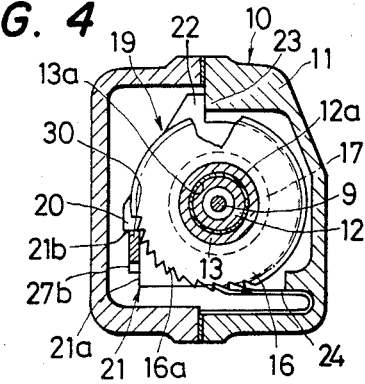
FIG. 4 is a cross sectional view showing the stop mechanism in detail.

The automatic adjusting device 10 in accordance with a first preferred embodiment comprises a housing 11 which is appropriately disposed on the vehicle 1, having the split construction as shown in FIGS. 4 and 5. The housing 11 forms a part of the operating wire 7, and divides the outer wire 8 into two segments, while the inner wire 9 extends through the housing 11.

An adjust bolt 12 is loosely fitted in the housing 11 adjacent to one end thereof (at the right-hand end in FIGS. 2 and 3), and extends axially thereof. The inner wire 9 extends through the adjust bolt 12. The adjust bolt 12 has an outer end to which one end of that segment of the outer wire 8 which leads to the brake unit 5 is secured to render the adjust bolt 12 unrotatable.

A cylindrical adjuster 13 is disposed in the housing 11 and the adjust bolt 12 is fitted in the adjuster 13. The adjuster 13 has a female thread 13a engaged with a male thread 12a on the adjust bolt 12. The adjuster 13 has a pair of ends rotatably supported by bearing throats 14 and 15, respectively, in the housing 11.

The adjuster 13 is provided intermediate the ends thereof with an integrally formed ratchet wheel 16 adapted to rotate the adjuster 13 in one direction to advance the adjust bolt 12. The ratchet wheel 16 has a boss 17 on which an annular stop plate 20 is rotatably supported. The stop plate 20 cooperates with one surface 18 of the bearing 14 in defining a stop mechanism 19 for the adjuster 13. The stop plate 20 is formed on its outer periphery with a hooked recess 21 defining a flat slide surface 21a and an engaging surface 21b which is perpendicular to the slide surface 21a. The engaging surface 21b is positioned in alignment with a ratchet tooth 16a on the ratchet wheel 16. A ratchet pawl 30 on an adjust lever 27 is slidably maintained in contact with the slide surface 21a of the recess 21.

When the pawl 30 is advanced (or moved upward in FIG. 5), it engages one of the teeth 16a on the ratchet wheel 16, and the engaging surface 21b. A stop tongue 22 forms an integral part of the stop plate 20, and is located opposite to the recess 21. The tongue 22 abuts on a stop rest 23 formed on the inner wall surface of the housing 11 to restrict the clockwise rotation of the stop plate 20. This is shown in FIG. 4.

A U-shaped pawl member 24 is secured to the housing 11 and has a free end engaged with one of the teeth 16a on the ratchet wheel 16 to prevent rotation of the ratchet wheel 16 when the stop plate 20 is rotated counterclockwise as shown in FIG. 4. A washer 25 and a dish-shaped spring 26 are disposed between the surface 18 of the bearing 14 in the housing 11 and one surface of the ratchet wheel 16. The spring 26 has a resilient force which urges the ratchet wheel 16 and the adjuster 13 to the right in FIGS. 2 and 3, and a gap $\delta_1$ is formed between the surface 18 of the bearing 14 and one surface of the stop plate 20. Under these circumstances, if the adjust lever 27 is rotated to advance the ratchet pawl 30 (or move it upward in FIG. 4), the ratchet wheel 16, hence the adjuster 13 and the stop plate 20 are both rotatable.

The adjust lever 27 is rotatably supported on a pin 28 in the housing 11 adjacent to the adjuster 13. The adjust lever 27 comprises a first lever 27a having an abutment member 29 facing an actuating member 35, and a second lever 27b having a free end terminating in the ratchet pawl engageable with one of the teeth 16a on the ratchet wheel 16 upon retracting rotation of the adjust lever. The second lever 27b is longer than the first lever 27a. An adjust lever pin 31 is provided on the first lever 27a, and engages a slot 32 formed in the second lever 27b. An adjust lever spring 33 is provided between the first and second levers 27a and 27b to normally allow them to rotate together, while the first lever 27a is slidable along the slot 32 if the inner wire 9 is pulled beyond a prescribed stroke. The adjust lever 27 is shaped like a bell crank defined by the first and second levers 27a and 27b. The second lever 27b has an engaging projection 27c which extends inwardly substantially at right angles thereto (or to the plane of FIG. 2) which is engageable with the inner end surface 12b of the adjust bolt 12.

Figure 3:
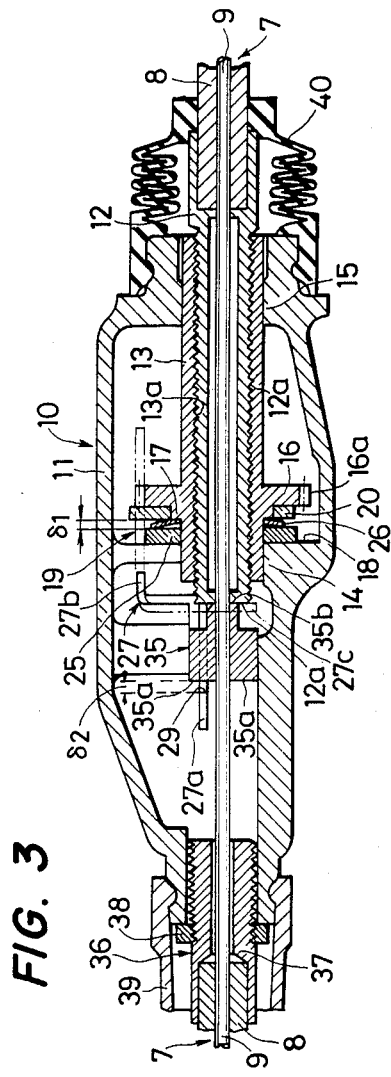
FIG. 3 is a longitudinal sectional view of the device shown in FIG. 2.

A return spring 34 has one end secured to the housing 11 and the other end is fastened to the free end of the second lever 27b. Hence, the adjust lever 27 may be urged counterclockwise as illustrated in FIGS. 2 and 3. If the inner wire 9 has been pulled beyond a prescribed stroke, resulting in the advancing rotation of the adjust lever 27 to exceed a prescribed amount, the force of the return spring 34 overcomes that of the adjust lever spring 33 to render only the first lever 27a rotatable.

The actuating member 35 is secured to the inner wire 9 in the housing 11 and has a front end surface 35a which is spaced from the abutment member 29 on the first lever 27a by a prescribed distance $\delta_2$. If the inner wire 9 is pulled to the left in FIGS. 2 and 3 to actuate the brake unit, the actuating member 35 abuts on the abutment member 29 to cause the adjust lever 27 to rotate clockwise in FIG. 2 against the force of the return spring 34. The actuating member 35 has an inner end surface 35b facing the inner end surface 12b of the adjust bolt 12 and engageable therewith.

An inner wire control mechanism 36 is provided between the outer wire 8 leading to the operating lever 3 and an adjacent end of the housing 11 shown at the left end of FIGS. 2 and 3. The control mechanism 36 comprises a bolt 37 rotatably fitted about the end of the outer wire 8 and threadedly connected in the end of the housing 11. A nut 38 is threadedly fitted about the bolt 37. When the bolt 37 is rotated, it moves axially relative to the housing 11 to move the outer wire 8 into or out of the housing 11 and thereby change the position of the actuating member 35 on the inner wire 9.

The relative position of the actuating member 35 to the adjust lever 27, or the distance $\delta_2$ may be maintained constant as will hereinafter be described. As shown in FIG. 2, the inner end 12b of the adjust bolt 12 is brought into engagement with the projection 27c of the adjust lever 27 fixed in its inoperative position. Then, the inner wire control mechanism 36 is moved to bring the inner end 35b of the actuating member 35 into engagement with the inner end 12b of the adjust bolt 12. It is therefore possible to determine the position of the actuating member 35 relative to the adjust lever 27 and maintain a constant normal (initial) play stroke for the operating wire 7. An expansible boot 40 is connected between the outer wire 8 and each end of the housing 11.

In operation, the operating lever 3 is rotated to pull the inner wire 9 in the operating wire assembly 7 to the left as shown in FIGS. 2 and 3, whereby the actuating lever 6 is rotated to actuate the brake unit 5. If the inner wire 9 is pulled to the left in FIGS. 2 and 3 when the operating wire 7 has an appropriate play stroke, the front end 35a of the actuating member 35 abuts against the abutment member 29 on the first lever 27a. If the inner wire 9 is pulled further, the first lever 27a is rotated clockwise in FIG. 2.

The adjust lever spring 33 has a greater spring force than the return spring 34 during the beginning of the rotation of the first lever 27a. Therefore, the spring 33 causes the second lever 27b to rotate clockwise in FIG. 2 with the rotation of the first lever 27a, while the return spring 34 is expanded. The ratchet pawl 30 on the second lever 27b retracts (or moves down in FIG. 4) along the slide surface 21a. Thus, the first and second levers 27a and 27b defining the adjust lever 27 are rotated together.

The retraction of the ratchet pawl 30 is smaller than the pitch between the teeth 16a of the ratchet wheel 16 on the adjuster 13. If the pressure on the operating lever is removed to stop pulling the inner wire 9 to the left, the return spring 34 causes the adjust lever 27 to rotate counterclockwise in FIG. 2. Hence, the ratchet pawl 30 is advanced or moved upward shown in FIG. 4. The adjuster 13 however is not rotated and therefore no adjustment is made for the elongation of the inner wire 9.

When the braking operation is repeated, the elongation of the inner wire 9 as a consequence of the elongation of the inner wire itself and the wear of the brake lining results in a gradually increasing play stroke. If elongation becomes so great to have an adverse effect on the braking operation, the retraction of the ratchet pawl 30 exceeds the pitch between the teeth 16a of the ratchet wheel 16 when the inner wire 9 has been pulled. This causes the actuating member 35 to rotate the adjust lever 27 clockwise. Accordingly, the ratchet pawl 30 causes the stop plate 20 to rotate slightly counterclockwise in FIG. 4, and engages another ratchet tooth 16a. If the braking operation is discontinued, the inner wire 9 is returned to its original position by the force of a return spring (not shown) in the brake unit 5.

The adjust lever 27 is rotated counterclockwise by the return spring 34, and the ratchet pawl 30 on the second lever 27b causes the ratchet wheel 16 to rotate clockwise in FIG. 4 by an angular distance equal to the pitch between the teeth 16a. The adjuster 13 is thereby rotated by the same distance in the same direction. The stop plate 20 is not rotated by any distance exceeding the pitch between the teeth 16a on the ratchet wheel 16, since its tongue abuts on the stop rest 23 and is unable to rotate any more in a clockwise direction in FIG. 4. If the adjuster 13 is rotated, the adjust bolt 12 is axially displaced to the right in FIGS. 2 and 3. As a result, the length of the outer wire 8 between the housing 11 and the brake unit 5 is substantially increased, and the inner wire 9 is correspondingly withdrawn into the outer wire 8. Hence, the play stroke of the inner wire 9 increased by its elongation is appropriately adjusted. When the adjuster 13 is rotated, the adjust bolt 12 does not rotate, since it is integrally connected to the outer wire 8.

This adjustment is repeated to control the play stroke of the inner wire 9, as long as the movement of the ratchet pawl 18 exceeds the pitch between the teeth 16a on the ratchet wheel 16 when the adjust lever 27 is rotated by the inner wire 9. Even if the operating wire 7 maintains an appropriate play stroke, the stop mechanism 19 functions to effect its over-adjustment if the inner wire 9 is pulled strongly by an excessive force. Such overadjustment is prevented in accordance with this invention as will hereinafter be described.

If the inner wire 9 is pulled to the left by a force exceeding that required for normal brake operation, it is tightly stretched. The outer wire 8 is longitudinally compressed. The dish-shaped spring 26, adjusted not to be compressed by the force required for normal brake operation, is compressed, resulting in the elimination of the gap $\delta_1$ as shown in FIGS. 2 and 3 between the surface 18 of the bearing 14 and the stop plate 20. The stop plate 20 is, therefore, pressed into contact with the surface 18 of the bearing 14 and is unable to rotate. As the inner wire 9 is pulled, the actuating member 35 causes the first and second levers 27a and 27b to rotate together by overcoming the force of the return spring 34. The ratchet pawl 30 on the second lever 27b retracts (or moves downward in FIG. 4) along the slide surface 21a of the recess 21 in the stop plate 20.

If the inner wire 9 is still pulled strongly after the stop plate 20 has been locked, the actuating member 35 is further moved to the left in FIGS. 2 and 3 beyond a prescribed stroke with the elastic deformation of the brake unit 5 and the operating wire 7. Since the stop plate 20 is locked, the ratchet pawl 30 does not engage a subsequent tooth 16a on the ratchet wheel 16, even if the retraction of the pawl 30 along the slide surface 21a exceeds the pitch between the teeth 16a.

It therefore follows that if the inner wire 9 is pulled beyond the prescribed stroke, the return spring 34 exerts a greater spring force than the adjust lever spring 33 if the adjust lever 27, that is, the first and second levers 27a and 27b have been rotated by the prescribed angle as a result of the movement of the actuating member 35 to the left as hereinabove set forth. Only the first lever 27a is now rotated against the force of the adjust lever spring 33, while the second lever 27b is not rotated.

If the inner wire 9 is released from any such excessive force, the adjust lever spring 33 causes the first lever 27a to return to its original position and the return spring 34 causes the first and second levers 27a and 27b to rotate together counterclockwise in FIG. 2. The ratchet pawl 30 advances or, as shown in FIG. 4, moves upward along the slide surface 21a, but does not rotate the ratchet wheel 16 and the adjuster 13. Therefore, no adjustment is made for the elongation of the operating wire 7, but any over-adjustment is prevented. When any such braking force is removed, the resilient force of the dish-shaped spring 26 causes the stop plate 20 to move to the right in FIG. 2 to restore the gap $\delta_1$, and the stop plate 20 is again freely rotatable. In this case, the inner wire 9 has an adjustable elongation, and the stop plate 20 is locked after the ratchet pawl 30 has been retracted by a distance exceeding the pitch between the ratchet teeth 16a. If the braking force is removed, therefore, the stop plate 20 is unlocked when the ratchet pawl 30 is in its retracted position exceeding the pitch between the teeth 16a. The pawl 30 engages one of the teeth 16a to rotate the adjuster 13 so that the elongation of the inner wire 9 may be properly controlled. The overadjustment of the inner wire 9 is, of course, in this case, prevented as described herein.

According to this embodiment of this invention, the adjust lever for adjusting the play stroke of the operating wire by its retracting rotation comprises the two levers which are normally rotatable together by virtue of the adjust lever spring, but only the first lever is rotatable against the force of the adjust lever spring after the braking force has been applied to cause the adjust lever to rotate by the prescribed angular distance by pulling the return spring. Since the forces of the two springs offset each other, the return spring exerts only a small force on the lever, and therefore, the lever is easily rotated. Because the second lever is longer than the first lever, it is sufficient to rotate the second lever by the prescribed stroke. Therefore, the space requirement for the housing can be minimized achieving a compact construction of the device.

Figure 9:
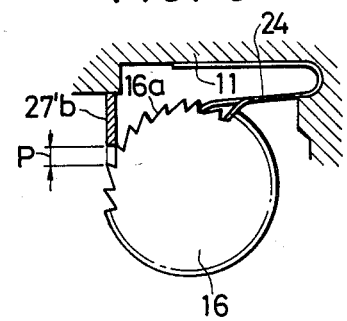
FIG. 9 is a view showing the relationship between the adjust lever and the ratchet wheel.

According to a second embodiment of this invention, a U-shaped pawl member 24' is secured to the housing 11, and has a free end engaging one of the teeth 16a on the ratchet wheel 16 to inhibit clockwise rotation of the ratchet wheel 16. This is illustrated in FIG. 9. A washer 25 and a dish-shaped spring 26 are disposed between one surface 18 of the bearing 14 and an adjacent surface of the ratchet wheel 16. The spring 26 has a resilient force which urges the ratchet wheel 16 and the adjuster 13 to the right in FIGS. 6 and 7. Therefore, a gap $\delta_1$ is formed between the surface 18 of the bearing 14 and the adjacent surface of the ratchet wheel 16. The housing 11 is provided with an adjuster rest 121 on which the ratchet wheel 16 is engageable to disable the rotation of the adjuster 13 when the adjuster 13 has been moved to the left in FIGS. 6 to 8 by overcoming the force of the dish-shaped spring 26 and eliminating the gap $\delta_1$.

Figure 8:
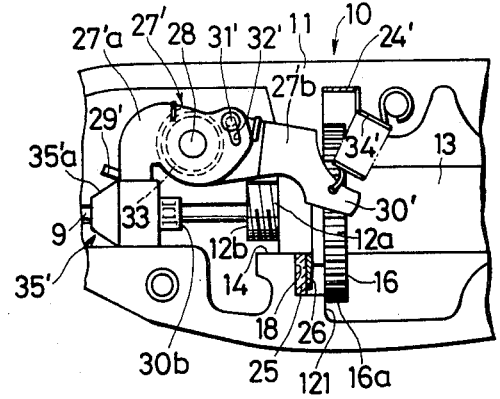
FIG. 8 is a detailed front elevational view showing an overadjustment.

An adjust lever 27' comprises a first lever 27'a having an abutment member 29' facing an actuating member 35', and a second layer 27'b having a ratchet pawl 30' engageable with one of the teeth 16a on the ratchet wheel 16 during the advancing rotation of the adjust lever 27'. The first lever 27'a has a slot 32', and the second lever 27'b has an adjust lever pin 31' engaged with the slot 32'. An adjust lever spring 33 is provided between the first and second levers 27'a and 27'b so that they normally rotate together. As shown in FIG. 8, such rotation occurs if a large force is applied to the adjust lever 27', while the first lever 27'a is displaceable along the slot 32'. A return spring 34' has one end secured to the housing 11, while the other end of the spring 34' is fastened to the second lever 27'b, so that the adjust lever 27' may be urged counterclockwise in FIGS. 6 and 8. The return spring 34' has a spring force less than that of the adjust lever spring 33.

The actuating member 35' is secured to the inner wire 9 in the housing 11, and has at its front end an inclined surface 35'a spaced apart from the abutment member 29' on the first lever 27'a by a distance $\delta_2$. If the inner wire 9 is pulled to the left in FIG. 7 for brake operation, the actuating member 35' abuts on the first lever 27'a to cause the adjust lever 27' to rotate clockwise in FIG. 6 against the force of the return spring 34'. The actuating member 35' has an inner end surface 35'b facing the inner end surface 12b of the adjust bolt 12 and engageable therewith.

Figure 6:
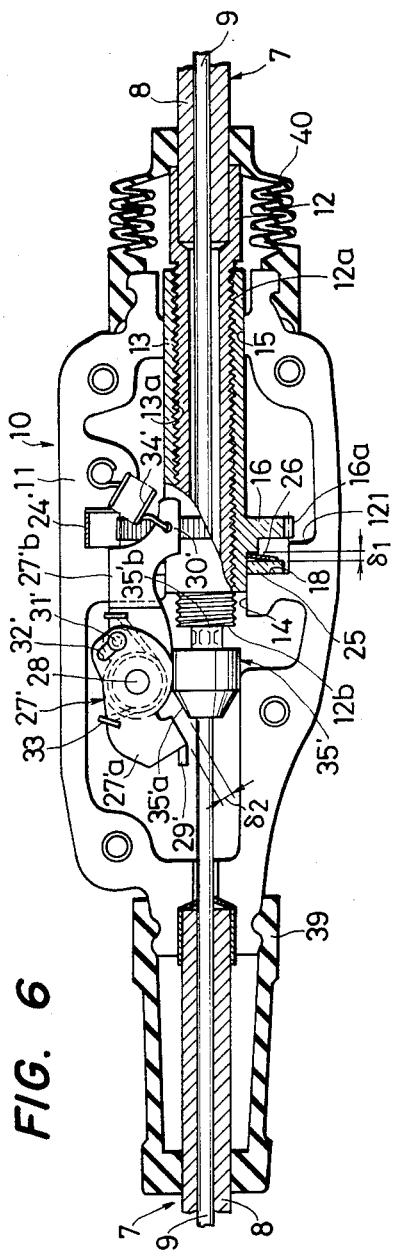
FIG. 6 is a front elevational view of a wire control device according to a second embodiment of this invention.
Figure 7:
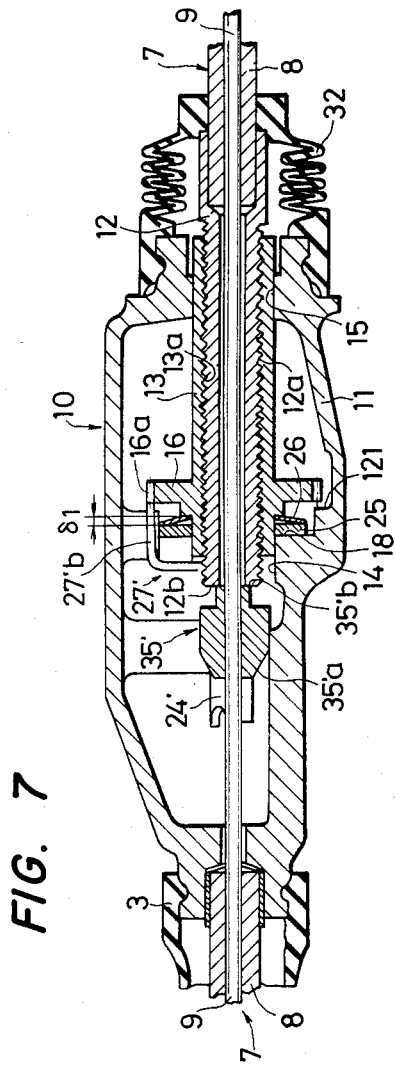
FIG. 7 is a longitudinal sectional view of the device shown in FIG. 6.

If the inner wire 9 is pulled to the left in FIGS. 6 and 7 when the operating wire 7 maintains an appropriate play stroke, the inclined surface 35'a of the actuating member 35' abuts on the abutment member 29' on the first lever 27'a, and causes the first lever 27'a to rotate clockwise in FIG. 6. The second lever 27'b is also rotated, since the adjust lever spring 33 has a greater spring force than the return spring 34'. No adjustment is made for the elongation of the inner wire 9, since the advancement of the ratchet pawl 30' does not exceed the pitch between the teeth 16a on the ratchet wheel 16.

If elongation of the inner wire 9 increases to the extent that it is likely to have an adverse effect on the brake operation, the ratchet pawl 30' on the second lever 27'b is rotated clockwise in FIG. 9 by an angular distance exceeding the pitch p between the teeth 16a on the ratchet wheel 16, and engages one of the teeth 16a. The ratchet wheel 16 is, therefore, rotated by an angular distance equal to the pitch between the teeth 16a, and the adjuster 13 is also rotated by the same angular distance in the same direction. Consequently, the play stroke of the inner wire 9 increased by its elongation is adjusted. If the braking operation is discontinued, the return spring 34' causes the adjust lever 27' to return to its original position.

This adjustment is repeated to maintain an appropriate play stroke for the inner wire 9 as long as the movement of the ratchet pawl 30' exceeds the pitch between the teeth 16a on the ratchet wheel 16 when the inner wire 9 has been pulled to rotate the adjust lever 27'.

The overadjustment of the operating wire 7 is prevented as will hereinafter be described. If the inner wire 9 is pulled by a force exceeding what is required for normal brake operation, it is tightly stretched, and the outer wire 8 is longitudinally compressed. As a result, the dish-shaped spring 26, which is not compressed by the force required for normal brake operation, is compressed, and the gap δ₁ is eliminated. The ratchet wheel 16 abuts on the adjuster rest 121, and an increased friction disables the rotation of the adjuster. The first lever 27'a is displaced along the slot 32' as shown in FIG. 8 by overcoming the force of the adjust lever spring 33. Therefore, no adjustment is made. Even if the inner wire 9 has an adjustable elongation, the adjuster 13 has a lock stroke exceeding the pitch between the ratchet teeth 16a.

If, upon rotation of the adjust lever 27, the ratchet pawl 30' on the second lever 27'b engages one of the teeth 16a and rotates the ratchet wheel 16 to some extent, the ratchet wheel 16 abuts on the adjuster rest 121, and the adjuster 13 is locked. If the braking operation is discontinued, the ratchet pawl 30' engages another tooth 16a, and when the braking force is again applied, the ratchet wheel 16 is rotated to advance the adjust bolt 12, whereby the outer wire 8 is prolonged to adjust the play stroke of the brake system. If the adjustment is repeated until an appropriate play stroke is obtained, the ratchet pawl 30' is no longer engaged with any tooth 16a on the ratchet wheel 16, but the adjustment is completed. The overadjustment is, of course also prevented in this case.

According to this embodiment of the invention, the adjust lever for adjusting the play stroke of the operating wire by its advancing rotation comprises the two levers which are normally rotatable together by virtue of the adjust lever spring, but only one of the levers is rotatable if an excessive force is applied, as hereinabove described. Therefore, the adjust lever has a smaller operating stroke resulting in a reduced input loss. It is also possible to ensure prevention of any overadjustment.

While this invention has been described with respect to both preferred embodiments, it is apparent that modifications can be effectuated without departing from the scope thereof.

We claim:

1. An operating wire control device for a brake system, comprising; a housing, an inner wire and an outer coaxial wire disposed in said housing, an adjust lever rotatable in accordance with the stroke of sid inner wire, an adjuster rotatable by the rotation of said adjust lever, said adjuster having an integrally formed ratchet wheel; an adjust bolt movable upon rotation of said adjuster to alter the relative length of said inner wire and an outer wire; said adjust lever comprising a first lever having an abutment member for detecting the stroke of said inner wire, a second lever having a ratchet pawl engaged with a ratchet tooth on said ratchet wheel, said second lever being longer than said first lever, an adjust lever spring provided between said first and second levers, and a return spring extending between said second lever and said housing, said adjust lever spring having a spring force with becomes smaller than that of said return spring when said inner wire has been pulled beyond a prescribed stroke.

2. The operating wire control device of claim 1, wherein said adjuster is rotatable by the retracting rotation of said adjust lever; said inner wire extending through said adjust bolt and said outer wire secured to an end of said adjust bolt preventing rotation thereof.

3. The operating wire control device of claim 1, further comprising an adjust lever pin provided on said first lever, said pin engaging a slot formed in said second lever and, said adjust lever spring allowing said first and second levers to rotate together except, when said inner wire is pulled beyond said prescribed stroke said first lever slides along said slot.

4. The operating wire control device of claim 1, wherein said return spring is secured between the free end of said second lever and said housing wherein if said inner wire exceeds said predetermined stroke the force of said return spring overcomes the force of said adjust lever to render only the first lever rotatable.

5. The operating wire control device of claim 1, further comprising an actuating member secured to said inner wire, said actuating member having one end surface spaced from said abutment member, wherein if said inner wire is pulled to actuate a brake unit said actuating member abuts on said abutment member to rotate said adjust lever.

6. The operating wire control device of claim 5, wherein said actuating member has another end surface engaging said adjust bolt.

7. The operating wire control device of claim 5, further comprising an inner wire control mechanism having a bolt rotatably secured to an end of said outer wire and connected in an end of said housing; a nut fitted on said bolt, wherein as said bolt rotated it moves axially in said housing moving said outer wire and thereby changing the position of said actuating member on the inner wire.

8. The operating wire control device of claim 1, wherein said adjuster is rotatable by the advancing rotation of said adjust lever; a U-shaped pawl secured to said housing having a free end engaging teeth on said ratchet wheel and, said adjuster rest engaged by said ratchet wheel to inhibit rotation of said adjuster when said adjuster moves in a direction overcoming the force of said dish-shaped spring to eliminate said stop gap.

9. The operating wire control device of claim 1, further comprising an actuating lever secured to said inner wire and having one end with an inclined surface spaced from an abutment member on said first lever, wherein when said inner wire is moved to effectuate a braking operation said actuating member abuts on said first lever to rotate said adjust lever in a direction opposing the force of said return spring.

10. The operating wire control device of claim 9, wherein said actuating member has a second end surface facing said adjust bolt and engaging it.

11. An operating wire control device for a brake system, comprising; a housing, an inner wire and an outer coaxial wire disposed in said housing; an adjust lever rotatable by detecting the stroke of said inner wire, an adjuster rotatable by the rotation of said adjust lever said adjuster having an integrally formed ratchet wheel; an adjust bolt movable upon rotation of said adjuster to alter the relative length of said inner wire and an outer wire; said adjust lever comprises a first lever having an abutment member for detecting the stroke of said inner wire, and a second lever having a ratchet pawl engaged with a ratchet tooth on said ratchet wheel, said first lever being formed with a slot, said second lever having an adjust lever pin engaged with said slot, an adjust lever spring being provided between said first and second levers, and having a stronger force than an adjust lever return spring provided between said second lever and a housing, so that said first and second levers may normally be rotated together, while said first lever is displaceable along said slot if a large force is applied to said adjust lever, a dish-shaped spring being disposed between said ratchet wheel and said housing to urge said adjuster axially to define a stop gap, and said housing being formed with a rest engageable by said adjuster moved to the extent that said stop gap is eliminated when an excessive force is applied.

* * * * *

UNITED STATES PATENT AND TRADEMARK OFFICE
CERTIFICATE OF CORRECTION

PATENT NO. : 4,570,506

DATED : February 18, 1986

INVENTOR(S) : Sadashi YAMAMOTO, Hiroaki KAYAMA and Masaki WATANABE

It is certified that error appears in the above-identified patent and that said Letters Patent is hereby corrected as shown below:

On the title page:
Please add assignee -- Honda Giken Kogyo K.K. --

Signed and Sealed this

Twenty-first Day of October, 1986

[SEAL]

Attest:

DONALD J. QUIGG

*Attesting Officer*  *Commissioner of Patents and Trademarks*